United States Patent
Komoda et al.

(10) Patent No.: US 9,572,337 B2
(45) Date of Patent: Feb. 21, 2017

(54) MITE PROPAGATION INHIBITION SHEET

(71) Applicant: KAMOI KAKOSHI CO., LTD., Kurashiki, Okayama (JP)

(72) Inventors: Kuniaki Komoda, Okayama (JP); Takaya Kitano, Okayama (JP)

(73) Assignee: KAMOI KAKOSHI CO., LTD., Kurashiki, Okayama (JP)

(*) Notice: Subject to any disclaimer, the term of this patent is extended or adjusted under 35 U.S.C. 154(b) by 144 days.

(21) Appl. No.: 14/531,257

(22) Filed: Nov. 3, 2014

(65) Prior Publication Data

US 2015/0143741 A1 May 28, 2015

(30) Foreign Application Priority Data

Nov. 22, 2013 (JP) .................... 2013-242400

(51) Int. Cl.
| | | |
|---|---|---|
| *A01M 1/14* | (2006.01) | |
| *A01M 1/10* | (2006.01) | |
| *B32B 37/12* | (2006.01) | |
| *A01M 1/02* | (2006.01) | |
| *B32B 37/18* | (2006.01) | |

(52) U.S. Cl.
CPC ............... *A01M 1/14* (2013.01); *A01M 1/02* (2013.01); *A01M 1/103* (2013.01); *B32B 37/1284* (2013.01); *B32B 37/18* (2013.01); *B32B 2305/20* (2013.01); *B32B 2309/105* (2013.01); *Y10T 156/10* (2015.01)

(58) Field of Classification Search
CPC ........... A01M 1/14; A01M 1/02; A01M 1/103
See application file for complete search history.

(56) References Cited

U.S. PATENT DOCUMENTS

| | | | | |
|---|---|---|---|---|
| 3,931,692 | A * | 1/1976 | Hermanson | A01M 1/2055 424/84 |
| 6,415,545 | B1 * | 7/2002 | Watanabe | A01M 1/02 43/114 |
| 2003/0159324 | A1 * | 8/2003 | Watanabe | A01M 1/026 43/14 |
| 2003/0186604 | A1 * | 10/2003 | Nourigat | A01M 1/04 442/123 |
| 2009/0288334 | A1 * | 11/2009 | Alexander | A01G 13/0281 43/131 |
| 2010/0043275 | A1 * | 2/2010 | Battick | A01M 1/14 43/114 |

(Continued)

FOREIGN PATENT DOCUMENTS

| | | |
|---|---|---|
| JP | 63-101079 | 6/1988 |
| JP | 64-56676 | 4/1989 |

(Continued)

*Primary Examiner* — Gary Hoge
(74) *Attorney, Agent, or Firm* — Flynn, Thiel, Boutell & Tanis, P.C.

(57) ABSTRACT

A mite propagation inhibiting sheet has a sheet layer, an adhesive layer, and an unwoven fabric layer wherein mites are allowed to invade from a surface of the unwoven fabric layer to which an adhesive is not adhered, thereby forming a colony and the mites are trapped by an adhesive of the adhesive layer when the mites invade deep in the unwoven fabric layer by instinct, and further, a method of manufacturing a mite propagation inhibiting sheet, and a method of inhibiting the propagation of mites.

3 Claims, 2 Drawing Sheets

(56) References Cited

U.S. PATENT DOCUMENTS

| | | | | |
|---|---|---|---|---|
| 2011/0008264 A1* | 1/2011 | Negishi | ............... | A01M 13/006 424/40 |
| 2014/0290123 A1* | 10/2014 | Duff | ........................ | A01M 1/02 43/114 |
| 2015/0020438 A1* | 1/2015 | Work | ....................... | A01M 1/14 43/114 |
| 2015/0033615 A1* | 2/2015 | Ishizaki | ................ | A01M 1/103 43/121 |

FOREIGN PATENT DOCUMENTS

| | | | |
|---|---|---|---|
| JP | 2001-128607 | A | 5/2001 |
| JP | 2004-215577 | A | 8/2004 |
| JP | 2006-67810 | A | 3/2006 |
| JP | 2013-14666 | A | 1/2013 |

* cited by examiner

FIG. 1(A)
(PRIOR ART)
FIG. 1(B)
(PRIOR ART)
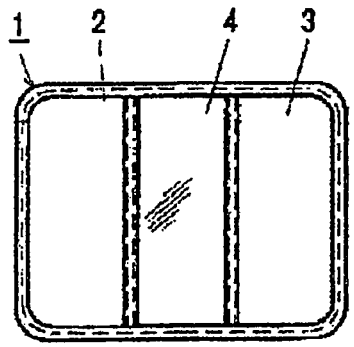
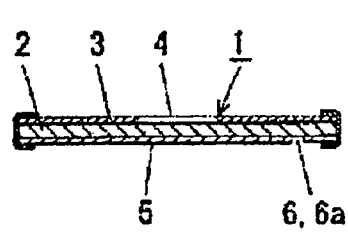
FIG. 2
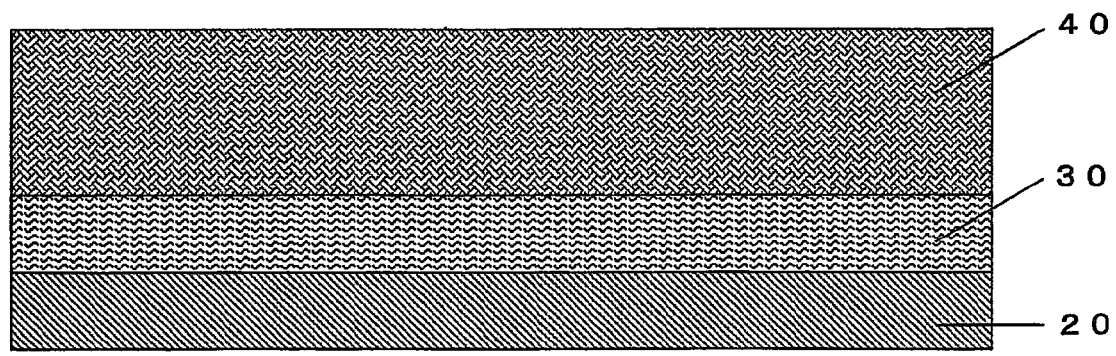
FIG. 3
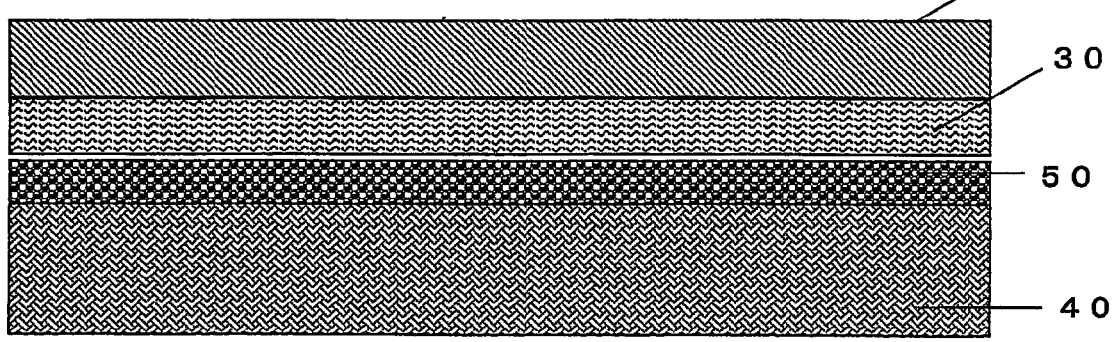

MITE PROPAGATION INHIBITION SHEET

The present invention relates to a mite and tick propagation inhibiting sheet (hereinafter referred to mite propagation inhibiting sheet) and, particularly, relates to a mite propagation inhibiting sheet for protecting chickens from *dermanyssus gallinae* and *ornithonyssus sylviarum*.

BACKGROUND OF THE INVENTION

There increases a case of generation of *allodermanyssus* (name: *dermanyssus gallinae*) in a chicken house. The number of laying eggs is decreased when a chicken is subject to blood-sucking by *allodermanyssus* (name: *dermanyssus gallinae*), and it sometimes happens that the chicken dies from stress in the worst cases.

Further, since people are also subject to blood-sucking by *allodermanyssus*, the labor turnover rate of workers working in chicken houses is increased. At a first stage, *allodermanyssus* is treated with insecticides, but *allodermanyssus* having a chemical resistance appears and hence it is a current state which leaves workers at a loss over how to cope with this problem.

It turns out that *allodermanyssus* are nocturnal in habit and live with chicken because they suck the blood of the chicken at night, and form colonies at joints of pipes and in small gaps in the daytime.

Patent document 1 discloses, as shown in FIG. 1, a trapping device 1 comprises an observation part 4 which is provided so as to confirm mites etc. attracted by an attraction sheet 2 for attracting mites etc., and attract the mites to the attraction sheet 2, wherein the attraction sheet 2 or an adhesive sheet to which an adhesive is adhered for killing the attracted mites etc. is attached to the trapping device 1 by insertion for killing the mites upon confirmation of the attraction of the mites by the observation part 4. A base sheet 5 such as a cloth material or an unwoven fabric 5 in which the mites etc. easily invade is overlaid on the upper surface side of the attraction sheet 2 which is coated or impregnated with attractants for attracting the mites etc., and wherein an observation part formed of a transparent film for confirming mites, etc. is provided on a part of a sheet cover 3, while the base sheet 5 is overlaid on the lower side surface of the attraction sheet 2, and a slit 6, pocket mouth 6a, etc. are provided on the base sheet 5 through which an insecticide sheet or the adhesive sheet is attached to the trapping device 1 by insertion. However, it is inevitable to form the trapping device 1 provided with a transparent observation part for confirming insects such as mites etc. attracted to an attraction sheet and also provided with a sheet for killing insects or sheet for adhering the insects to which an insecticide is adhered for killing the attracting mites, etc., which is however complex in structure and needs an attractant and insecticide, and hence there is a high possibility of the occurrence of harm to poultry such as chicken etc. to be protected from mites etc.

Patent document 2 discloses an adhesive composition for trapping mites mainly comprising a natural rubber and/or synthetic rubber, and a rubber adhesive containing at least one of a tackifier resin selected from a rosin-based resin, terpene-based resin, synthetic petroleum resin, phenol-based resin, xylene-based resin, alicyclic-based petroleum resin, coumarone-indene resin, styrene-based resin, dicyclopentadiene resin, and also discloses the preparation of mite-trapping adhesive sheets, by use of the adhesive composition, which are stacked in layers on a support member. Although there is exemplified in Patent document 2 that an unwoven fabric is used for a sheet, there is no example of the unwoven fabric being adapted for trapping mites.

Prior Art Documents
Patent Document
Patent Document 1: JP 2004-215577 A
Patent Document 2: JP 2001-128607 A

SUMMARY OF THE INVENTION

The present invention relates to a mite propagation inhibiting sheet and particularly provides a mite propagation inhibiting sheet for protecting chicken from *dermanyssus gallinae* and *ornithonyssus sylviarum*.

As a result of observations by the present inventors about the mode of life of *dermanyssus gallinae*, it turns out that *dermanyssus gallinae* are nocturnal in habit and hide in needles jointing parts of gauges of a chicken house, in gaps between feed straps and attached fittings, and gaps of reinforced pipe fittings in the daytime, and invade the chicken house to get into the chickens at night. Accordingly, the present inventors attempted to trap *eermanyssus gallinae* by the use of an unwoven fabric in which the *eermanyssus gallinae* easily colonize wherein a part of the unwoven fabric is impregnated with an adhesive, and when the *dermanyssus gallinae* invades deep in the unwoven fabric, the *dermanyssus gallinae* are trapped by the adhesive. As a result, the present inventors found that many *dermanyssus gallinae* are trapped with a simple structure and completed the present invention.

That is, the present invention provides a mite propagation inhibiting sheet comprising a sheet layer, an adhesive layer, and an unwoven fabric layer wherein mites are allowed to invade from a surface of the unwoven fabric layer to which an adhesive is not adhered, thereby forming a colony and the mites are trapped by an adhesive of the adhesive layer when the mites invade deep in the unwoven fabric layer by instinct. Further, according to the present invention, it is preferable that the sheet layer is in the range from 0.03 to 0.5 mm thick, the adhesive layer is in the range from 0.01 to 0.5 mm thick, and the unwoven fabric is in the range from 2 to 12 mm thick.

Still further, according to the present invention, it is preferable that a part of the unwoven fabric layer at the adhesive layer side intrudes into the adhesive layer side.

The present invention further provides a method of manufacturing a mite propagation inhibiting sheet comprising the steps of providing an adhesive layer by coating a sheet layer at one side surface with a liquid adhesive, providing an unwoven fabric layer onto the adhesive layer, pressing these three layers lightly together, thereby integrating these three layers with one another.

The present invention still further provides a method of manufacturing a mite propagation inhibiting sheet comprising the steps of providing an adhesive layer by coating an unwoven fabric layer at one side surface with a liquid adhesive by an adhesive spray such that the adhesive is adhered up to a part of an inside of the unwoven fabric, while the adhesive is not adhere to the unwoven fabric at the other side surface, and pressing a sheet layer light to the unwoven fabric layer coated with the adhesive at one side surface, thereby integrating these four layers with one another.

The present invention more still further provides a method of inhibiting propagation of mites comprising the steps of winding the mite propagation inhibiting sheet around needles, feed straps, and reinforced pipes of cages of a chicken house such that the unwoven fabric layer side contacts the needles, feed straps, and reinforced pipes.

Since the mite propagation inhibiting sheet of the present invention is simple in structure, it is not only manufactured cheaply but also adapted for mass-production. Further, mites are allowed to invade from a surface of the unwoven fabric layer to which an adhesive is not adhered to prepare a colony and the mites can be trapped by an adhesive of the adhesive layer when the mites invade deep in the unwoven fabric layer by instinct.

Further, the mite propagation inhibiting sheet is especially effective against *dermanyssus gallinae* and it is possible to safely manage a chicken house. Still further, since an adhesive part of the conventional adhesive sheet is exposed to trap vermin, there is a possibility that the adhesive part adheres to clothes, pets, agricultural crops, etc. Meanwhile, the adhesive part of the sheet of the present invention is adhered to the unwoven fabric, but not exposed, so there is no danger of adhering to clothes, etc. and an adhesive does not remain on pipes of cages even if it is directly placed on pipes, etc. when it is installed in the cages.

BRIEF DESCRIPTION OF DRAWINGS

FIGS. 1(A) is a plan view and 1(B) is a sectional view, for explaining a prior art respectively;

FIG. 2 is a sectional view of a mite propagation inhibiting sheet according to one embodiment of the invention;

FIG. 3 is a sectional view of a mite propagation inhibiting sheet according to another embodiment of the invention.

BEST MODE FOR CARRYING OUT THE INVENTION

Figure 4:
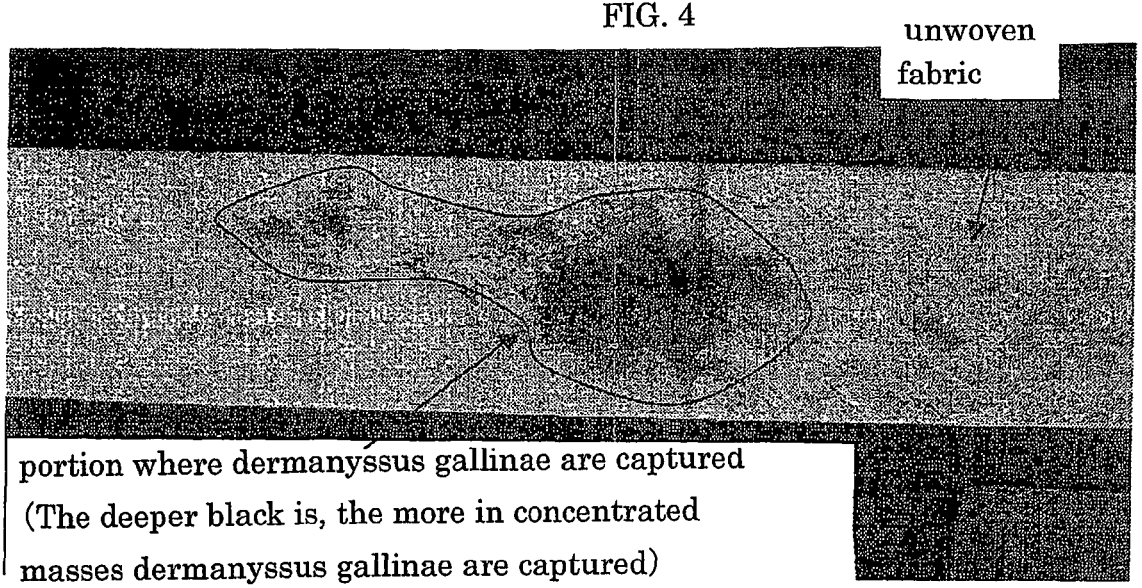
FIG. 4 is a view showing a state where *dermanyssus gallinae* are tapped four days after installment of the mite propagation inhibiting sheet according to one embodiment of the invention.

A configuration of a mite propagation inhibiting sheet 10 relating to the present invention is now described hereinafter.

As a sheet to be used in a sheet layer for use in the present invention, there can be provided examples of a synthetic resin sheet such as polyethylene, polypropylene, polyester, polyvinyl chloride, etc., and a pasted sheet wherein the synthetic resin sheet and paper are stuck together. The thickness of the sheet is suitable in the range from 0.03 mm to 0.5 mm. The sheet is preferable to be opaque but it is allowed to be transparent. The sheet is allowed to be colored or non-colored.

As an adhesive for use in the present invention, an adhesive used as an adhesive tape can be used. Further, a natural-based, a synthetic-based, and an acrylic-based adhesive can be used. Still further, an adhesive adapted to a spray coating can be used. For example, an adhesive as disclosed in JP 2013-014666A can be preferably used. The thickness of an adhesive layer is suitably in the range of from 0.01 to 0.5 mm, and it is preferable that a part of the adhesive layer intrudes into an unwoven fabric layer. Mites, particularly, *dermanyssus gallinae* have an instinct to invade deep into the unwoven fabric layer, so that mites are allowed to invade from a surface of the unwoven fabric to which an adhesive is not adhered, thereby capturing the mites at the innermost part of the unwoven fabric.

As the unwoven fabric layer for use in the present invention, there can be provided examples of a synthetic fiber unwoven fabric such as a polyolefin-based resin like polyethylene or polypropylene, a polyester, rayon, polyvinyl alcohol, polyamide, acrylic, etc. and a natural pulp fiber unwoven fabric such as wooden pulp, Manila hemp, etc. Further, there are used unwoven fabrics having a high aeration property. The thickness of the unwoven fabric layer is suitable in the range of from 2 mm to 12 mm, particularly preferably in the range of from 3 mm to 5 mm.

EXAMPLE 1

FIG. 2 shows a method of manufacturing a mite propagation inhibiting sheet 10 comprising the steps of providing an adhesive layer 30 by coating a sheet layer 20 at one side surface with an adhesive, and providing an unwoven fabric layer 40 on the adhesive layer 30 and then pressing these three layers together lightly to thereby integrate these three layers.

A polyester sheet in the thickness of 0.1 mm is coated at one side surface with a hot-melt synthetic rubber adhesive by a hot-melt synthetic rubber adhesive device so that the thickness of the hot-melt synthetic rubber adhesive is 0.08 mm. Then a polyester-based unwoven fabric having a thickness of 3 mm is adhered to the adhesive layer by a pressing roller with a low pressure, thereby integrating these three layers to fabricate the mite propagation inhibiting sheet 10. An adhesive is not adhered to the surface of the unwoven fabric side of the mite propagation inhibiting sheet 10.

EXAMPLE 2

FIG. 3 shows a method of manufacturing a mite propagation inhibiting sheet 10 comprising the steps of coating a surface of an unwoven fabric layer 40 at one side thereof with an adhesive layer 30 provided with a layer 50 wherein an adhesive intrudes inside a part of the unwoven fabric by hot-melt spray coating, then pressing the sheet layer 20 lightly onto the surface of the unwoven fabric coated with the adhesive at one side thereof, thereby integrating these four layers.

The polyester sheet in the thickness of 4 mm is coated at one side surface with the adhesive layer 30 provided with the layer 50 wherein an adhesive intrudes inside a part of the unwoven fabric by spraying a hot-melt synthetic rubber-based adhesive with a hot-melt spray coating. Then a polyethylene-based laminate paper in the thickness of 0.1 mm is adhered to the adhesive layer by a pressing roller with a low pressure, thereby integrating these four layers to fabricate the mite propagation inhibiting sheet 10. An adhesive is not adhered to the surface of the unwoven fabric side of the mite propagation inhibiting sheet 10.

EXAMPLE 3

There is shown a method of manufacturing a mite propagation inhibiting sheet 10 comprising the steps of coating a surface of an unwoven fabric layer 40 at one side thereof with an adhesive layer 30 provided with a layer 50 wherein an adhesive invades inside a part of the unwoven fabric by an adhesive spray, then pressing the sheet layer 20 light on the surface of the unwoven fabric coated with the adhesive at one side thereof, thereby integrating these four layers.

The polyester sheet in the thickness of 4 mm is coated at one side surface with the adhesive layer 30 provided with the layer 50 wherein an adhesive intrudes inside a part of the unwoven fabric by spraying a synthetic rubber-based adhesive spray encapsulated in an aerosol can. Then the adhesive layer is covered with a polyethylene-based sheet in a thickness of 0.05 mm and the same sheet is pressed lightly by hand to thereby integrate these four layers and fabricate the mite propagation inhibiting sheet 10. An adhesive is not adhered to the surface of the unwoven fabric side of the mite propagation inhibiting sheet 10.

The mite propagation inhibiting sheets 10 obtained in Examples 1 to 3 are installed so as to wind around feed straps, and reinforced pipes of cages of the chicken house in a summer season wherein the unwoven fabric side contacts the feed straps, and reinforced pipes by use of clothespins, adhesive tapes, etc. The result is shown in Table 1. Further, 4 days later state of Example 1 is shown in FIG. 4.

TABLE 1

| mite propagation inhibiting sheet | Example 1 | Example 2 | Example 3 |
|---|---|---|---|
| 2 hours later | X | X | X |
| 6 hours later | X | Δ | Δ |
| 1 day later | Δ | ○ | ○ |
| 2 days later | ○ | ⊙ | ⊙ |
| 3 days later | ⊙ | ⊙ | ⊙ |
| 4 days later | ⊙ | ⊙ | ⊙ |

Symbols in Table 1 are as follows.
X Dead mite can not be found
Δ There are sparse dead mites
○ There are a lot of dead mites
⊙ Dead mites form colony As is evident from the above mentioned result, the mite propagation inhibiting sheet 10 of the present invention is simple in structure, and particularly effective against *dermanyssus gallinae* in the chicken house, and indispensable for the chicken industry.

What is claimed is:

1. A mite propagation inhibiting sheet comprising, in this order, a sheet layer, an adhesive layer, a first unwoven fabric layer having a first surface attached to the adhesive layer and a second unwoven fabric layer provided at a second surface of the first unwoven fabric layer which is opposite to the first surface, wherein mites enter the mite propagation inhibiting sheet through the second unwoven fabric layer and are trapped by an adhesive in the adhesive layer.

2. The mite propagation inhibiting sheet of claim 1, wherein the adhesive in the adhesive layer is also contained inside of the first unwoven fabric layer.

3. A method of inhibiting the propagation of mites in an enclosure containing fowl comprising the step of attaching the mite propagation inhibiting sheet of claim 2 to a structure contained in the enclosure, wherein the second unwoven fabric layer is brought into contact with the structure.

* * * * *